United States Patent
Lavoie (10) Patent No.: US 9,827,970 B2
(45) Date of Patent: Nov. 28, 2017

(54) VEHICLE STOPPING ASSIST AND SPEED CONTROL SYSTEM

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 174 days.

(21) Appl. No.: 14/644,505

(22) Filed: Mar. 11, 2015

(65) Prior Publication Data

US 2016/0264137 A1 Sep. 15, 2016

(51) Int. Cl.

| | | |
|---|---|---|
| *B60W 30/09* | (2012.01) | |
| *B60W 30/16* | (2012.01) | |
| *B60W 10/18* | (2012.01) | |
| *B60T 7/22* | (2006.01) | |
| *B60W 10/04* | (2006.01) | |
| *B60W 10/20* | (2006.01) | |
| *B60W 30/06* | (2006.01) | |

(52) U.S. Cl.
CPC ............... *B60W 10/18* (2013.01); *B60T 7/22* (2013.01); *B60W 10/04* (2013.01); *B60W 10/20* (2013.01); *B60W 30/06* (2013.01); *B60W 30/16* (2013.01); *B60T 2201/10* (2013.01); *B60W 2510/1005* (2013.01); *B60W 2520/06* (2013.01); *B60W 2520/10* (2013.01); *B60W 2550/142* (2013.01); *B60W 2550/308* (2013.01)

(58) Field of Classification Search
CPC ............................. B60W 30/09; B60W 30/16
See application file for complete search history.

(56) References Cited

U.S. PATENT DOCUMENTS

| | | | | |
|---|---|---|---|---|
| 4,670,845 | A * | 6/1987 | Etoh | ................. B60K 31/0008 |
| | | | | 180/169 |
| 7,027,920 | B2 | 4/2006 | Madau | |
| 7,392,121 | B2 * | 6/2008 | Arima | ................. B62D 5/0481 |
| | | | | 180/204 |
| 7,719,410 | B2 | 5/2010 | Labuhn et al. | |
| 8,265,850 | B2 | 9/2012 | Shin | |
| 9,121,717 | B1 * | 9/2015 | Zhu | ..................... B60W 30/16 |
| 9,415,774 | B2 * | 8/2016 | Sugano | ............... B62D 15/027 |
| 2005/0143895 | A1 * | 6/2005 | Kato | ................. B60K 31/0008 |
| | | | | 701/96 |

(Continued)

FOREIGN PATENT DOCUMENTS

WO 1997037878 A1 10/1997

OTHER PUBLICATIONS

Mercedes-Benz, The New Mercedes-Benz C-Class—Sheer Attraction, Daimler Communications, 70546 Stuttgart, Germany, Mar. 2014, 108 pgs.

*Primary Examiner* — Tisha Lewis (74) *Attorney, Agent, or Firm* — Frank A. MacKenzie; Brooks Kushman P.C.

(57) ABSTRACT

A vehicle, a vehicle speed control system, and a method of controlling vehicle speed are provided. The vehicle may include a powertrain and a controller. The controller may be programmed to reduce a powertrain output based on a braking comfort parameter such that a speed becomes less than a threshold speed associated with the parking maneuver prior to completion of the parking maneuver.

12 Claims, 4 Drawing Sheets

(56) References Cited

U.S. PATENT DOCUMENTS

2006/0025893 A1* 2/2006 Fischer .............. B60K 31/0008
  701/1
2013/0297173 A1 11/2013 Takagi et al.
2015/0344034 A1* 12/2015 Niino .................... B60W 30/16
  701/96

* cited by examiner

VEHICLE STOPPING ASSIST AND SPEED CONTROL SYSTEM

TECHNICAL FIELD

This disclosure relates to a vehicle speed control and stopping assist system.

BACKGROUND

Modern vehicles may be equipped with a system to avoid potential collisions with other vehicles. The system may be a low-speed collision avoidance system in communication with a plurality of vehicle sensors that may provide signals indicative of a vehicle speed and distance to an object so that brakes may be applied to stop the vehicle.

SUMMARY

In at least one embodiment, a vehicle is provided. The vehicle may include a powertrain and a controller. The controller may be programmed to, while the vehicle is executing a parking maneuver and in response to a speed of the vehicle exceeding a threshold, reduce a powertrain output. The reduction of the powertrain output may be based on a braking comfort parameter such that the speed becomes less than the threshold prior to the completion of the parking maneuver.

In at least one embodiment, a vehicle speed control system is provided. The vehicle speed control system may include a controller. The controller may be programmed to, in response to a distance between a vehicle and an object proximate the vehicle becoming less than a first threshold and a speed of the vehicle being greater then a target speed that is based on a pitch of the vehicle and the distance, reduce the speed to the target speed.

In at least one embodiment, a method of controlling vehicle speed is provided. The method may include, in response to a first distance between a vehicle and an object proximate the vehicle becoming less than a first threshold and a vehicle speed being greater than the predetermined speed associated with the first distance, operating a powertrain to satisfy the predetermined speed associated with the first distance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
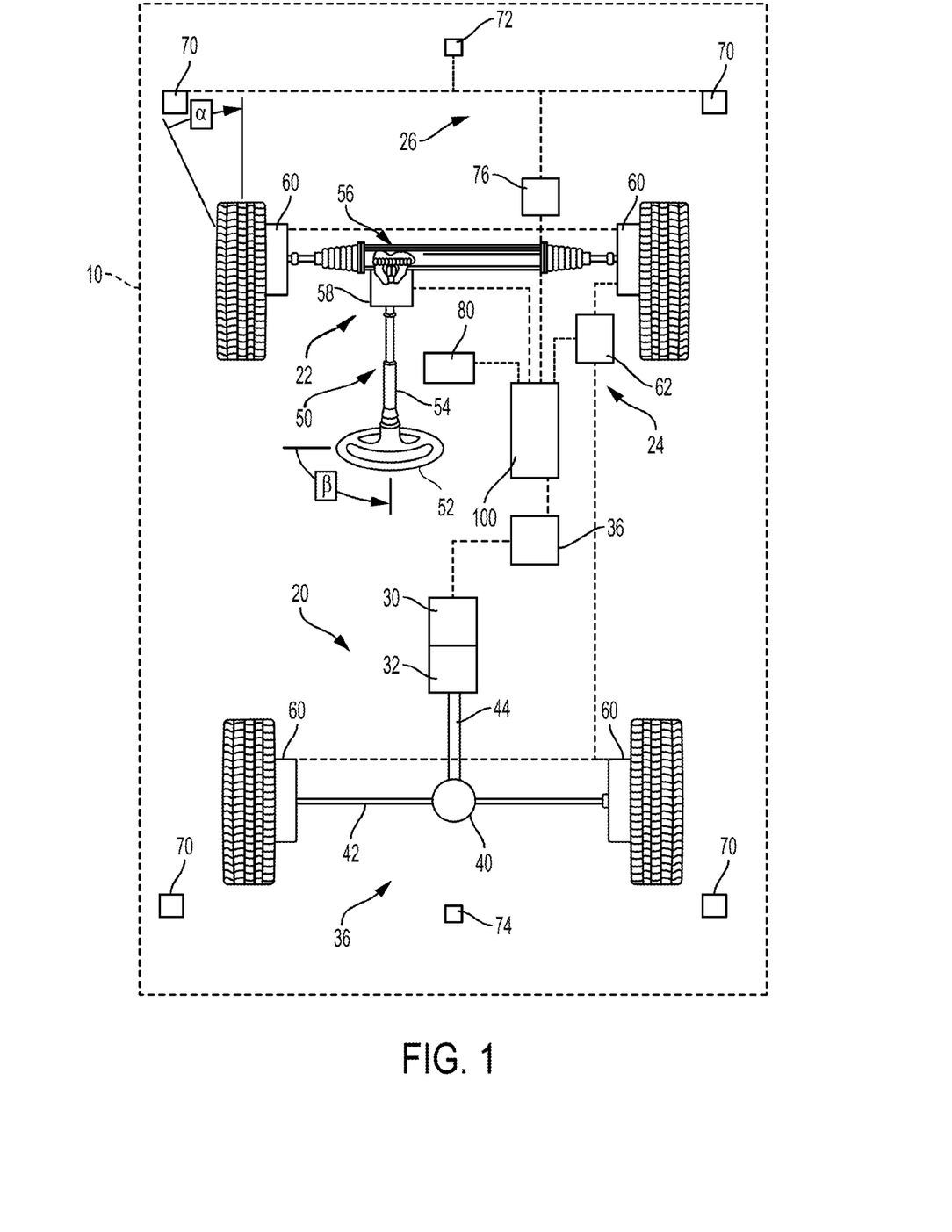
FIG. 1 is an exemplary embodiment of a vehicle having a stopping assist and speed control system.

Referring to FIG. 1, a vehicle 10 may be provided. The vehicle 10 may be a motor vehicle such as an automobile, a truck, farm equipment, or military transport vehicle. The vehicle 10 may include a powertrain 20, a steering system 22, a brake system 24, and a parking system 26.

The powertrain 20 may provide torque to one or more wheel assemblies to propel the vehicle 10. The powertrain 20 may include an engine 30, a transmission 32, a powertrain controller 34, and at least one drive axle assembly 36.

The engine 30 may be configured as an internal combustion engine that may be adapted to operate using any suitable type of fuel, such as gasoline, diesel, ethanol, hydrogen, etc. The engine 30 may provide power or a propulsive torque that may be used to rotate one or more wheel assemblies to propel the vehicle 10.

The transmission 32 may be driveably connected to the engine 30 and to the drive axle assembly 36. The transmission 32 may be of any suitable type such as an automatic or manual multi-gear or step ratio transmission. As used herein, the term transmission may also include a transfer case or differential 40.

The powertrain controller 34 may be configured to schedule transmission shift events, output a transmission gear position, vary a powertrain output torque, or a power-split between powertrain components if the vehicle 10 is so equipped. The powertrain controller 34 may control various friction elements or actuators of the transmission 32, such as clutches and/or brakes, to selectively transmit power from the engine 30 to the vehicle wheels according to various transmission gear ratios.

The drive axle assembly 36 may rotatably support a wheel assembly via a driveshaft 42. An output shaft 44 may be connected to an input of the differential 40.

The steering system 22 may be configured to vary a wheel direction of a wheel assembly 50. The steering system 22 may include a steering wheel 52 in rotatable connection with the wheel assembly 50 through a steering linkage 54. The steering linkage 54 may be coupled to a steering mechanism 56. The steering mechanism 56 may be connected to the wheels of the wheel assembly 50.

The steering mechanism 56 may be configured to articulate or pivot the wheels of the wheel assembly 50 about a kingpin axis responsive to rotation of the steering wheel 52. The wheel direction of the wheels of the wheel assembly 50 may be shown as a wheel angle position a and the corresponding rotational position of the steering wheel 52 may be shown as a steering wheel angle position β. A steering angle sensor may be configured to provide a signal indicative of the wheel angle position a and/or the steering wheel angle position β.

A power steering motor 58 may be coupled with the steering linkage 54 and/or the steering mechanism 56. The power steering motor 58 may be configured to impart motion or apply torque to the steering mechanism 56 to vary the wheel direction of the wheels of the wheel assembly 50.

The brake system 24 may include a brake assembly 60 in communication with an ABS module 62. The brake assembly 60 may be configured as a friction brake that may slow or inhibit rotation of at least one wheel associated with the vehicle 10. The brake assembly 60 may be configured as a drum brake or a disc brake.

The ABS module 62 may be configured to provide a brake torque request to the brake assembly 60. The brake torque request may control the amount or force of brake application provided by the brake assembly 60, in response to a depression of a vehicle brake pedal and a braking comfort parameter. In at least one embodiment, the ABS module 62 may be configured to monitor a speed of the vehicle 10 based on a wheel speed and a wheel direction.

Figure 2:
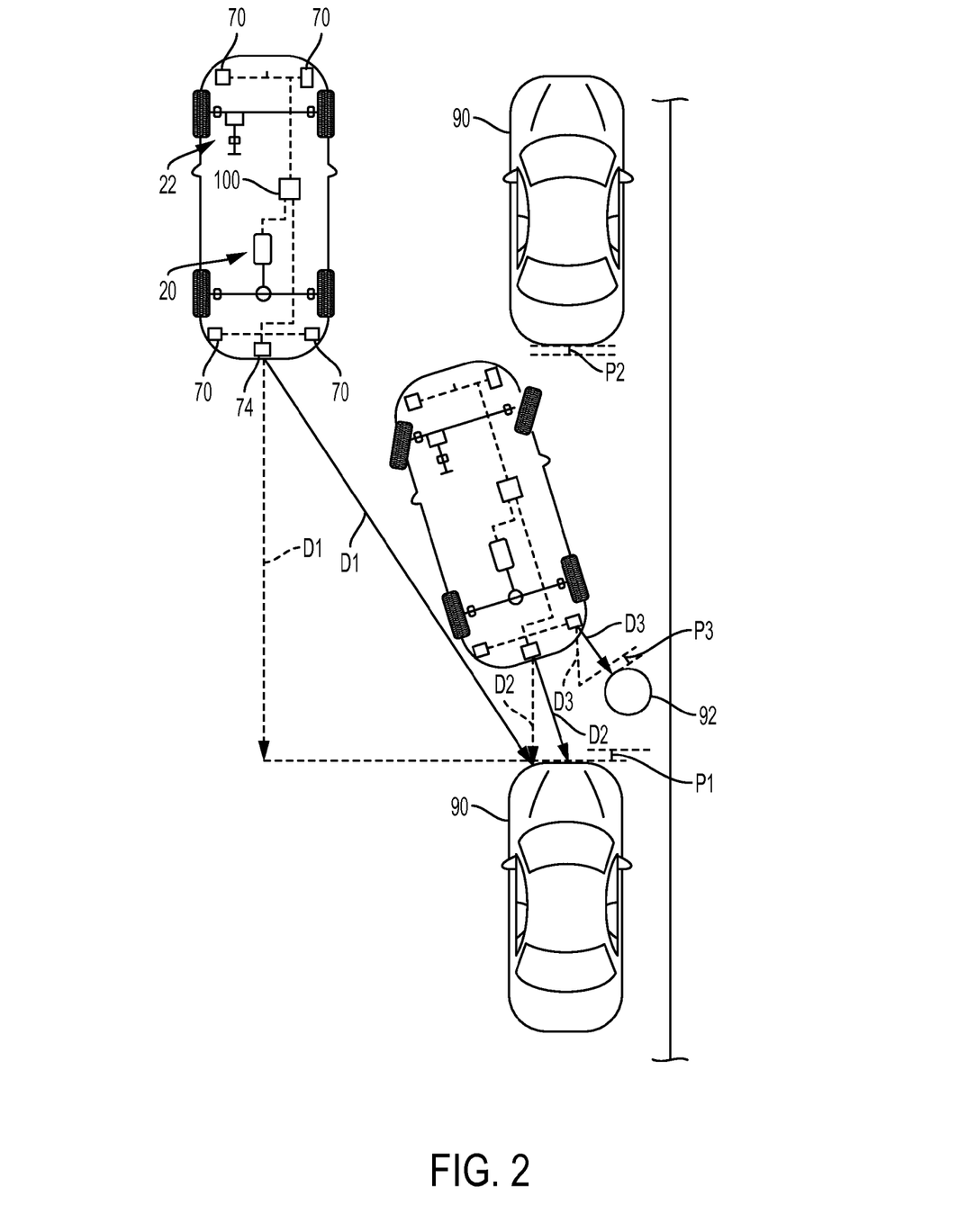
FIG. 2 is a perspective view of a vehicle performing a parking maneuver proximate a parking location.

Referring to FIG. 2, a perspective view of the vehicle 10 performing an exemplary parking maneuver proximate a parking location is shown. The parking system 26 may assist the operator of the vehicle 10 in executing parking maneuvers and without operator intervention, may guide the vehicle 10 into an identified parking location. The parking system 26 may be configured to guide the vehicle 10 into the identified parking location and stop the vehicle within a predetermined distance from an object either aft of the vehicle 10, $P_1$, or forward of the vehicle 10, $P_2$.

The parking maneuver may be calculated or determined by the parking system 26 by known techniques. Examples of such guidance path calculation techniques are shown in Toledo et al., U.S. Patent Publication No. 20110260887 A1 and Toledo et al., U.S. Pat. No. 8,169,341 B2, which are hereby incorporated by reference in their entirety.

The parking system 26 may be configured to operate the powertrain 20, the steering system 22, and the brake system 24 to execute and complete the parking maneuver. The parking system 26 may include a plurality of parking sensors 70, a forward object detection sensor 72, and a rear object detection sensor 74 all in communication with the parking module 76.

The plurality of parking sensors 70 may be disposed proximate the corners of the vehicle 10. The plurality of parking sensors 70 may be configured to provide full or nearly full sensory coverage about the vehicle 10. The number, type, and or positioning of the plurality of parking sensors 70 may vary based on the vehicle application. The plurality of parking sensors 70 may include a parking sensor, a proximity sensor, and/or a side looking sensor.

The plurality of parking sensors 70 may be configured as ultrasonic sensors including a transmitter and a receiver. In at least one embodiment, the plurality of parking sensors 70 may be configured as a radar, lidar, optical sensor, or the like. The forward object detection sensor 72 may be a forward-looking camera configured to provide information as to obstacles or objects forward of the vehicle 10. The information may be provided to the operator the vehicle via a human machine interface 80. The forward object detection sensor 72 may be disposed proximate a front portion of the vehicle 10.

The rear object detection sensor 74 may be rearward-looking camera configured to provide information as to obstacles or objects aft of the vehicle 10. The information may be provided to the operator of the vehicle via the human machine interface 80. The rear object detection sensor 74 may be disposed proximate a rear portion of the vehicle 10.

The plurality of parking sensors 70 may be configured to provide a signal indicative of a distance between the vehicle 10 and an object 90 proximate the vehicle 10. The object 90 may be another vehicle. The plurality of parking sensors 70 may be configured to provide a signal indicative of a distance between the vehicle 10 and an obstacle 92 that may enter into the path of the vehicle 10 while the vehicle 10 is being operated, such as a person, garbage can, bicycle, or other inanimate object.

The parking system 26 may be configured to monitor a distance between the vehicle 10 and an object 90 based on a plurality of zones extending about the vehicle. The zones may be ranked based on distances from the vehicle 10. For example, Zone n may be the closest zone to the vehicle 10 and Zone n+1 may be the furthest zone from the vehicle 10 in which an object 90 may be detected by the plurality of parking sensors 70. In some embodiments, Zone n+1 may be the closest zone to the vehicle 10 and Zone n may be the furthest zone from the vehicle 10 in which an object 90 may be detected by the plurality of parking sensors 70.

As used in the present disclosure and shown in FIG. 2, Zone 1 may correspond to a first distance, $D_1$, from the vehicle 10. Zone 2 may correspond to a second distance, $D_2$, from the vehicle 10. Zone 3 may correspond to a third distance, $D_3$, from the vehicle 10.

A controller 100 may be in communication with the powertrain controller 34, the ABS module 62, and the parking module 76. The controller 100 may be a vehicle system controller or a plurality of controllers in communication with each other over a CAN BUS network.

The controller 100 may be configured to establish a predetermined vehicle speed threshold associated with a zone while the parking system 26 is executing a parking maneuver. The controller 100 may also be configured to establish a predetermined vehicle speed threshold associated with a zone while the vehicle 10 is operating and not executing a parking maneuver. The predetermined vehicle speed threshold associated with the zone may vary depending on whether the vehicle is executing a parking maneuver or not.

The controller 100 may be configured to establish a predetermined deceleration associated with the zone while the parking system 26 is executing a parking maneuver. The controller 100 may also be configured to establish a predetermined deceleration associated with a zone while the vehicle 10 is operating and not executing a parking maneuver. The predetermined deceleration associated with the zone may vary depending on whether the vehicle is executing a parking maneuver or not.

The predetermined deceleration may be a rate at which the vehicle speed is reduced. Based on the predetermined vehicle speed, the predetermined deceleration, the powertrain gear position, the brake torque request, a maximum brake output torque, the zone, and the vehicle wheel direction, the controller 100 may be configured to provide the braking comfort parameter to affect the braking output torque applied to the brake assembly 60.

The braking comfort parameter may enable the vehicle 10 to provide a comfortable or smooth stop as the vehicle 10 completes a parking maneuver, which may be referred to as stopping control. The braking comfort parameter may also enable the vehicle 10 to comfortably decelerate as the vehicle 10 approaches an object 90 forward of the vehicle 10 in various situations, which may be referred to as speed control. The braking comfort parameter may limit the application of a brake pump of the brake assembly 60 to more gradually or comfortably bring the vehicle 10 to a stop or speed reduction.

The stopping control function may be enabled as the vehicle 10 is approaching an object 90 during a parking maneuver. The controller 100 may be programmed to, while the vehicle 10 is executing a parking maneuver relative to an object 90, to monitor a speed of the vehicle 10. The controller 100 may compare the current speed of the vehicle to the predetermined vehicle speed threshold associated with the current zone and distance, $D_1$, between the vehicle 10 and the object 90. The controller 100 may command a reduction in an output torque of the powertrain 20, if the speed of the vehicle 10 exceeds the predetermined vehicle speed threshold associated with the current zone. The reduction in the output torque of the powertrain 20 may be based on the braking comfort parameter such that the speed of the vehicle 10 becomes less than or approximate the predetermined vehicle speed threshold associated with the current zone prior to the completion of the parking maneuver. The output torque of the powertrain 20 may be reduced at least until the completion of the parking maneuver. In at least one embodiment, the output torque of the powertrain 20 may be progressively reduced as the vehicle 10 moves progressively closer to the object 90. In at least one embodiment, the output speed of the powertrain 20 may be limited or progressively reduced by the controller 100 as the vehicle 10 moves progressively closer to the object 90.

The controller 100 may be programmed to, while the vehicle 10 is executing the parking maneuver relative to an object 90, to monitor a distance, $D_2$, between the vehicle 10 and the object 90. The controller 100 may operate the brake system 24 to reduce the vehicle speed such that the speed of the vehicle 10 becomes less than or approximate the predetermined vehicle speed threshold associated with the current zone, if the speed of the vehicle 10 exceeds the predetermined vehicle speed threshold associated with the distance, $D_2$. The operation of the brake system 24 may be based on the braking comfort parameter and at least one of the speed of the vehicle and the predetermined vehicle speed threshold associated with the distance, $D_2$. In at least one embodiment, the brake torque applied to the brake assembly 60 may be progressively increased as the vehicle moves progressively closer to the object 90. The distance, $D_1$, may be greater than the distance, $D_2$.

The controller 100 may be programmed to, while the vehicle 10 is nearing completion of the parking maneuver relative to the object 90 and in response to a signal indicative of the object 90 within a zone closer to the vehicle 10, operate the brake system 24. The brake system 24 may be operated such that the vehicle 10 stops within the predetermined distance, $P_1$ or $P_2$, from the object 90, without operator intervention.

The brake torque applied by the brake assembly 60 to stop the vehicle 10 within the predetermined distance, $P_1$ or $P_2$, may be less than a maximum brake torque capability of the brake system 24 in order to reduce noise, vibration, and harshness of the stop. The reduction in the maximum brake torque capability may reduce the amount of suspension rocking and improve occupant comfort during the stop.

The controller 100 may be programmed to stop the vehicle 10 within a predetermined distance from an obstacle 92, without operator intervention. The obstacle 92 may be detected by the plurality of parking sensors 70 while the vehicle 10 is executing the parking maneuver with reference to the object 90. In response to the plurality of parking sensors 70 providing a signal indicative of a distance, $D_3$, between the vehicle and the obstacle, the controller 100 may be programmed to operate the brake system 24 such that the vehicle 10 stops within a predetermined distance, $P_3$, from the obstacle 92.

The brake torque applied by the brake assembly 60 to stop the vehicle 10 within the predetermined distance, $P_3$, from the obstacle 92 may be less than a maximum brake torque capability in order to reduce noise, vibration, and harshness of the stop. The brake torque applied to the brake assembly 60 may be greater than the brake torque applied to the brake assembly when an obstacle 92 is not detected. This increase in the brake torque applied to the brake assembly 60 may increase the amount of suspension rocking and may be less comfortable than the stop performed to complete the parking maneuver.

Figure 3:
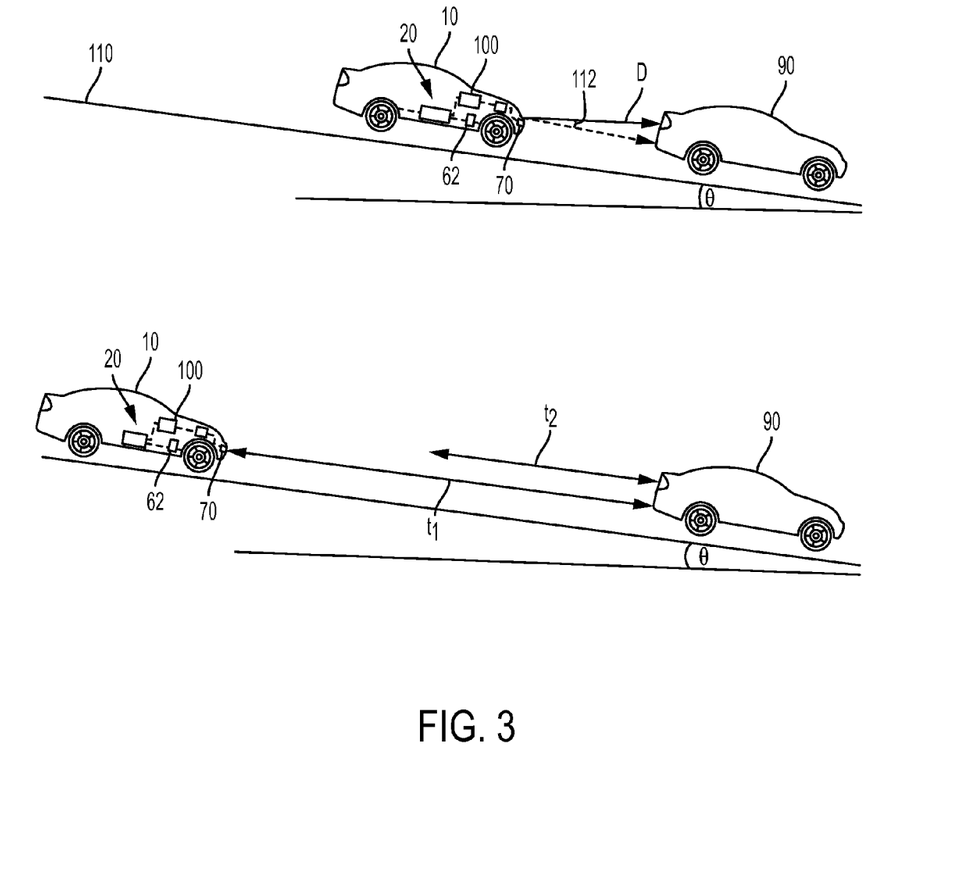
FIG. 3 is a perspective view of a vehicle on a graded surface approaching another vehicle.

Referring to FIG. 3, a perspective view of the vehicle 10 on a graded surface 110 approaching another vehicle is shown. The speed control function may be enabled as the vehicle 10 is approaching an object 90 forward of the vehicle 10, such as another vehicle, while not executing a parking maneuver. The vehicle 10 may be operating on a graded surface 110 and have a pitch angle 112. The vehicle 10 may be provided with a stand-alone vehicle pitch angle sensor or may include a body control module configured to provide various vehicle dynamic parameters such as roll angle, pitch angle, and yaw rate.

The controller 100 may be programmed to monitor a distance between the vehicle 10 and the object 90, while the vehicle 10 is operating on a graded surface 110. The controller 100 may have a target vehicle speed associated with various distances between the vehicle 10 and the object 90. In response to a distance, D, between the vehicle 10 and the object 90 becoming less than a first threshold distance, $t_1$, and a speed of the vehicle 10 being greater than the target vehicle speed associated with the distance, D, the controller 100 may reduce the speed of the vehicle 10 approximately to the target vehicle speed associated with the distance, D, without operator intervention. The speed of the vehicle 10 may be reduced based on the pitch angle 112 and the distance, D.

The speed of the vehicle 10 may be reduced such that the distance, D, between the vehicle 10 and the object 90 becomes greater than the first threshold distance, $t_1$. The controller 100 may be programmed to reduce the speed of the vehicle 10 by limiting a powertrain output torque or a powertrain output speed or activating the brake system 24. The powertrain output may be reduced at least until the distance, D, between the vehicle 10 and the object 90 becomes greater than the first threshold distance, $t_1$, without operator intervention.

In at least one embodiment, the powertrain output may be reduced by providing a modified accelerator pedal position. The modified accelerator pedal position may provide a decreased powertrain output torque or speed command as compared to the current accelerator pedal position. The modified accelerator pedal position may be based on a pedal map relating accelerator pedal position to a powertrain output torque or speed.

The controller 100 may reduce the speed of vehicle 10 by activating the brake system 24. The brake system 24 may be activated to provide a brake torque to the brake assembly 60 while the distance, D, between the vehicle 10 and the object 90 is less than a second threshold distance, $t_2$. The brake torque may be based on a predetermined deceleration, the distance, D, and the braking comfort parameter. The second threshold distance, $t_2$, may be less than the first threshold distance, $t_1$.

Figure 4:
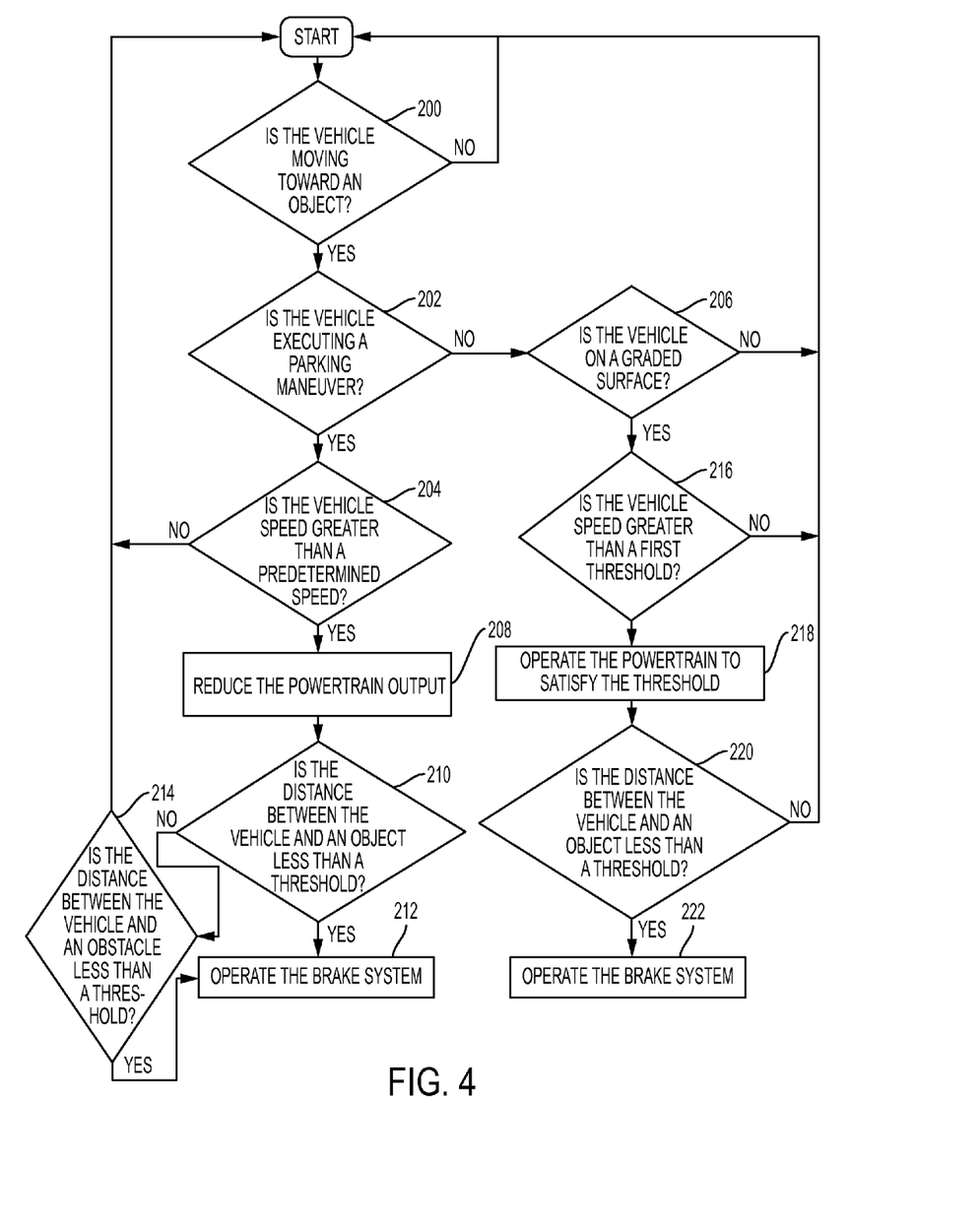
FIG. 4 is an exemplary method of controlling vehicle speed.

Referring to FIG. 4, an exemplary method of controlling vehicle speed is shown. The method may receive a signal indicative of a distance between the vehicle 10 and an object 90 and a vehicle speed. At block 200, the method may determine if the vehicle 10 is moving towards an object 90. The vehicle 10 may be moving towards the object 90 if a first distance between the vehicle and the object 90 is becoming less than a first threshold distance and the vehicle speed is greater than a predetermined speed associated with the first threshold distance. The first threshold distance may be a distance associated with the furthest zone from the vehicle 10, Zone 1, in which an object 90 may be detected by the plurality of parking sensors 70. If the vehicle 10 is not moving towards an object 90, the method may restart the execution of the cycle.

At block 202, the method may determine if the vehicle 10 is executing a parking maneuver. The vehicle 10 may be executing the parking maneuver if the parking system 26 identified a parking location and the powertrain 20 and the steering system 22 are being operated to guide the vehicle 10 into the parking location. If the vehicle 10 is executing a parking maneuver, the method may proceed to block 204. Should the vehicle 10 not be executing a parking maneuver while moving toward an object 90, the method may proceed to block 206.

At block 204, the method may compare the vehicle speed to the predetermined parking maneuver speed associated with the first threshold distance. If the vehicle speed is greater than the predetermined parking maneuver speed associated with the first threshold distance the method may reduce the powertrain output torque at block 208. At block 208, the powertrain output may be speed limited or torque limited based on a combination of at least two of the vehicle speed, a vehicle set speed, a brake speed set above the vehicle set speed, and a predetermined deceleration threshold such that the vehicle deceleration is less than the predetermined deceleration threshold. The limiting of the vehicle deceleration to less than the predetermined deceleration threshold may improve the comfort of vehicle occupants as the vehicle 10 is slowed to within the predetermined parking maneuver speed associated with the first threshold distance. Should the vehicle speed not be greater than the predetermined parking maneuver speed associated with the first threshold distance the method may restart the execution of the cycle. In at least one embodiment, at block 208, the vehicle speed may be reduced by operating the brake system 60 and the powertrain 12 to manage the total vehicle speed The method may continue to assess the distance between the vehicle 10 and the object 90. At block 210, the method may compare the distance between the vehicle 10 and the object 90 to a second threshold distance. If the distance between the vehicle 10 and the object 90 is less than the second threshold distance the method may operate the brake system 24, at block 212. The brake system 24 may be operated to reduce the vehicle speed based on the distance between the vehicle 10 and the object 90 and a predetermined deceleration threshold based on the braking comfort parameter. Should the distance between the vehicle 10 and the object 90 be greater than the second threshold distance the method may continue to block 214.

At block 214, the method may continue to assess whether an obstacle is within view of the plurality of parking sensors 70. The method may assess the distance between the vehicle 10 and the obstacle 92. If an obstacle 92 is detected at a distance between the vehicle 10 and the obstacle 92 less than a third threshold distance, while the vehicle is executing the parking maneuver, the method may operate the brake system 24. The brake system 24 may be operated based on the braking comfort parameter such that the vehicle 10 is stopped within a predetermined distance, $P_3$, between the vehicle 10 and the obstacle 92. Should the distance between the vehicle 10 and the obstacle 92 be greater than the third threshold distance, the method may restart the execution of the cycle.

Returning to block 206, the method may receive a signal indicative of a pitch angle 112. The vehicle 10 may be operating on a graded surface 110 if the pitch angle 112 is greater than a pitch angle threshold. If the vehicle is operating on a graded surface 110 the method may continue to block 216. Should the pitch angle be less than a pitch angle threshold, the method may restart the execution of the cycle.

At block 216 the method may compare the vehicle speed to a vehicle speed threshold associated with the first threshold distance. If the vehicle speed is greater than the vehicle speed threshold associated with the first distance, the method may operate a powertrain 20 to satisfy the vehicle speed threshold at block 218. The powertrain output may be torque limited or speed limited based on the pitch angle 112 and the distance between the vehicle and the object 90. The powertrain output torque may be reduced at least until the distance between the vehicle 10 and the object 90 becomes greater than the first threshold distance. Should the vehicle speed be less than the vehicle speed threshold associated with the first distance the method may restart the execution of the cycle.

At block 220 the method may compare the distance between the vehicle 10 and the object 90 to a second threshold distance. If the distance between the vehicle 10 and the object 90 being less than the second threshold distance and the vehicle speed being greater than a predetermined speed associated with the second threshold distance the method may operate the brake system 24 at block 222. The brake system 24 may be operated to reduce the vehicle speed based on the distance and a predetermined deceleration threshold associated with the second threshold distance. Should the distance between the vehicle and the object 90 be greater than the second threshold distance and the vehicle speed being less than the predetermined speed associated with the second threshold distance, the method may restart the execution of the cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a powertrain;
a brake system; and
a controller programmed to, while the vehicle is executing a parking maneuver and in response to a speed of the vehicle exceeding a threshold, reduce powertrain output based on a braking comfort parameter such that the speed becomes less than the threshold prior to completion of the parking maneuver, wherein the controller is further programmed to, in response to (i) a signal indicative of distance between the vehicle and an object and (ii) the speed exceeding another threshold dictated by the distance, operate the brake system based on the braking comfort parameter such that the speed becomes less than the another threshold.

2. The vehicle of claim 1 wherein the braking comfort parameter is based on a powertrain gear position, a brake torque request, or a vehicle wheel direction.

3. The vehicle of claim 1 wherein the controller is further programmed to, in response to a signal indicative of a distance between the vehicle and an obstacle in a path of the vehicle, operate the brake system such that the vehicle stops a predetermined distance from the obstacle.

4. The vehicle of claim 3 wherein the braking comfort parameter is based on a maximum brake output torque, and a predetermined deceleration threshold associated with the distance between the vehicle and the object and the distance between the vehicle and the obstacle.

5. The vehicle of claim 3 wherein the distance between the vehicle and the object is greater than the distance between the vehicle and the obstacle.

6. A vehicle speed control system comprising:
a controller programmed to, in response to a distance between a vehicle and an object becoming less than a first threshold and a speed of the vehicle exceeding a target speed that is based on a pitch of the vehicle and the distance, reduce the speed to the target speed by reducing a powertrain output at least until the distance exceeds the first threshold, wherein reducing the powertrain output includes activating a braking system to apply a brake torque based on a predetermined deceleration while the distance is less than a second threshold which is less than the first threshold.

7. A method comprising:
in response to a distance between a vehicle and an object becoming less than a first threshold and a vehicle speed exceeding a first predetermined speed dictated by the first threshold, reducing a powertrain output according to a pitch of the vehicle to reduce the vehicle speed to the first predetermined speed; and
in response to the distance becoming less than a second threshold and the vehicle speed exceeding a second predetermined speed dictated by the second threshold, operating a brake system to reduce the vehicle speed according to a predetermined deceleration.

8. The method of claim 7 wherein the powertrain output is reduced at least until the distance becomes greater than the first threshold.

9. The method of claim 7 further comprising, in response to the vehicle speed exceeding a predetermined speed associated with a parking maneuver while the vehicle is executing the parking maneuver, reducing the powertrain output based on the vehicle speed and a predetermined deceleration threshold such that vehicle deceleration is less than the predetermined deceleration threshold.

10. The method of claim 9 further comprising, in response to a distance between the vehicle and an obstacle proximate the vehicle becoming less than a third threshold while the vehicle is executing the parking maneuver, operating a brake system based on a braking comfort parameter to stop the vehicle a predetermined distance from the obstacle.

11. The method of claim 10 wherein the braking comfort parameter is based on the vehicle speed and a vehicle wheel direction.

12. The method of claim 9 wherein the powertrain output is reduced at least until a completion of the parking maneuver.

* * * * *